May 7, 1940.  E. W. BLANKENSHIP  2,199,687
COMBINATION COOKING VESSEL
Filed Nov. 16, 1939
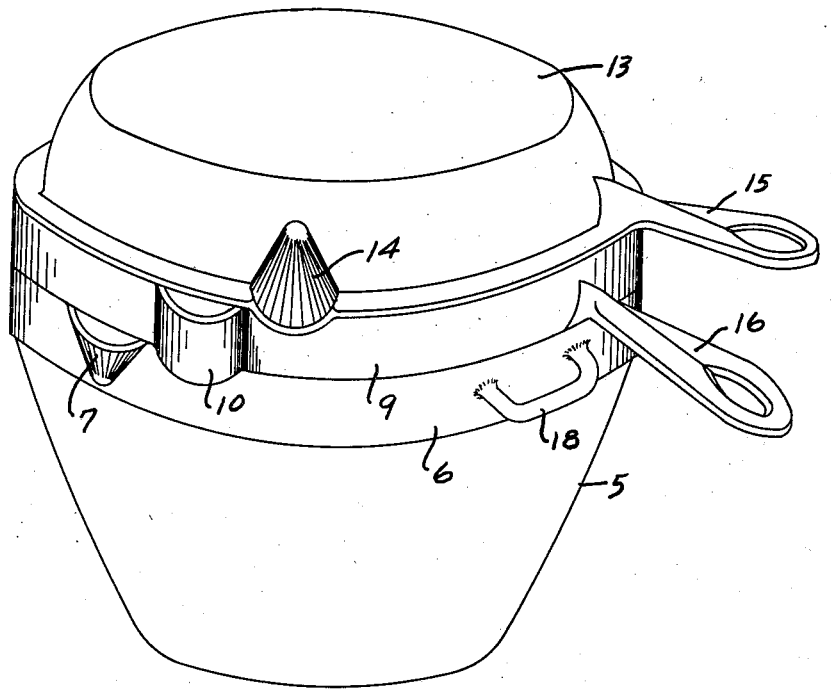
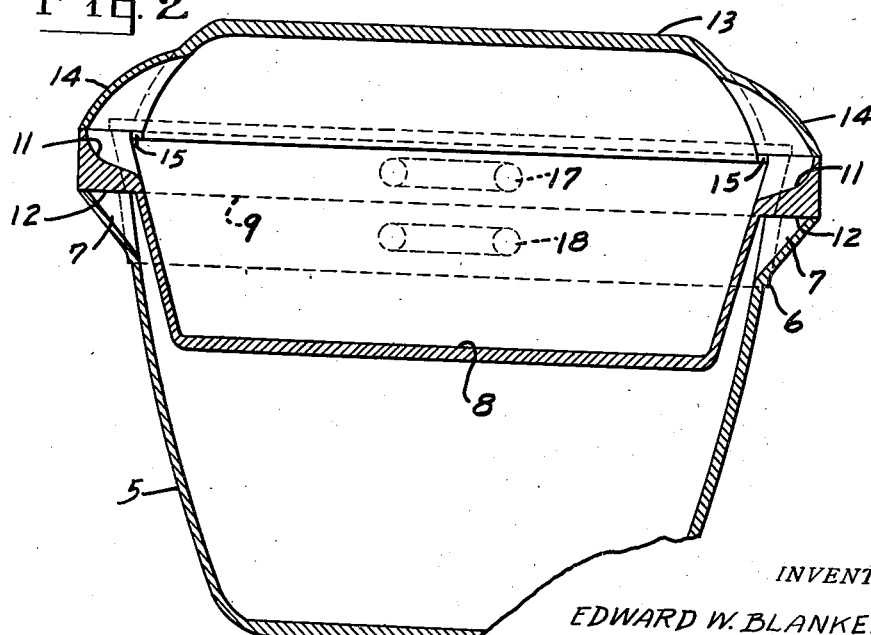
INVENTOR
EDWARD W. BLANKENSHIP
BY
ATTORNEYS Patented May 7, 1940

2,199,687

UNITED STATES PATENT OFFICE 2,199,687

COMBINATION COOKING VESSEL

Edward W. Blankenship, Chattanooga, Tenn.

Application November 16, 1939, Serial No. 304,658

5 Claims. (Cl. 53—1)

My invention relates to a combination cooking utensil in which vessels, separately usable for various cooking purposes and of various sizes, are adapted to be combined, one with the other, so as to provide a variety of simple or compound cooking vessels.

More particularly, my invention relates to a combination utensil comprising a boiler, a baking pan and a frying pan, the baking pan being adapted to set down into the boiler to form therewith a double boiler with a top closure when the frying pan is placed on the baking pan in inverted position, and the baking pan with the frying pan in inverted position thereon being adapted to form a Dutch oven.

Such combination utensils are well known in the trade and have come into high favor, but in the manipulation of these vessels in a combination cooking utensil, whether a double boiler or a Dutch oven, certain disadvantages have been experienced, because no special provision has been made for venting the steam or highly heated air or gases from one or the other vessels of the combination cooking utensil, before it is opened, and as a result, since the top vessel is the frying pan which is customarily raised by its handle so that the steam or hot gases flow suddenly out into contact with the user's hand and inflict thereon serious burns, particularly where it is steam that is emitted.

One object of my invention, therefore, is especially to design the component vessels of my combination cooking utensil so that, in respect of each cooking vessel in the combination, the hot air gases therein can be vented at a point remote from the lifting handle of its cover vessel.

My invention further contemplates providing each of the cooking vessels with top shoulders formed with a pouring lip on either or both sides spaced from its handle or handles, each vessel serving as a cover being designed and adapted to be rotated about a vertical axis so as to bring its lip or lips into or out of register with the lip or lips of the subjacent vessel to vent or close its vents.

My invention further contemplates forming the frying pan with a top centering bead or beads that throughout lie within a circle concentric with the pan so that when used as a cover for the Dutch oven or the single or double boiler its lips can be rotated freely into or out of register with the subjacent lips.

A further distinctive feature of my invention is the provision, under each lip on the intermediate or noninverted upper vessel, of a shoulder which will serve as a cover for the corresponding subjacent vessel lip when shifted into register therewith.

My invention further contemplates providing the baking pan with a handle like the frying pan on one side and with a short lifting handle on the opposite side, thus providing it with handle elements suitable to support it from both sides and at the same time furnishing it with one extended handle by means of which such vessel can readily be turned to vent steam from the pot or vessel beneath it before it is lifted off, which is normally done by first tilting it up on its edge opposite the handle as a fulcrum.

My invention will be better understood by reference to the accompanying drawing which illustrates its novel features in their preferred embodiment.

In Fig. 1 I show the combination utensil assembled with its component vessels forming a double boiler and with its intermediate and upper vessel shifted to bring their lips out of register so as to vent steam or hot air from each cooking vessel.

In Fig. 2 I show a transverse cross section, taken through the combination cooking utensil with its lip elements in register closing the several lip vents.

Similar reference numerals refer to similar parts throughout the drawing.

In the embodiment illustrated, 5 is a vessel that is representative of a single boiler formed with a top shoulder 6 in which on opposite sides I form pouring and vent lips 7.

The intermediate vessel 8, shown as a baking pan, is formed with a shoulder 9, of like diameter with the shoulder 6, having enlargements 10, disposed diametrically opposite, each providing a top pouring lip 11 and a flat bottom surface 12 adapted to form a lid or closure for the vent defined by a lip 7 of the boiler 5.

The uppermost vessel 13 is shown as a frying pan having opposite pouring lips 14 and formed with a top flange of like diameter with the shoulders 6 and 9 on which is formed opposite substantially semi-annular shoulders 15, which when the pan is inverted, will fit into the boiler or baker and due to the fact that the shoulders do not follow the conformation of the lips 7 or 11, this frying pan can be rotated freely upon the pot or pan, thereby to bring its inverted pouring lips 14 into or out of register with the pouring lips 7 or 11.

The frying pan and baking pan are each provided with handles 15 and 16 respectively which are similar and arranged equi-distantly between their lips. To assist in handling the heavier baking pan 8, I provide it also with a loop handle 17 opposite its handle 16. The boiler 5 is provided with a pair of opposed loop handles 18.

In operation, with the vessels assembled as shown in Fig. 2, if it be desired to examine the contents of the vessel 8 the handle 15 of the frying pan is grasped and the latter is turned on the top shoulder of the vessel 8 until its pouring lips 11 are uncovered to form vents. As soon as the steam has escaped from vessel 8, the pan 13 can be lifted off in the usual manner by rocking it on its flange edge opposite its handle 15 on shoulder 9 as a fulcrum until it almost assumes vertical position when it can be lifted off without strain on the wrist. In speaking of handling the pan 13 in this manner, it should be understood that the vessels in question are customarily made of cast iron and of considerable weight.

In like manner, when it is desired to examine the contents of the pot 5, either the vessel 8, if that be the only one seated in position on the pot 5, or the inverted vessel 13, if that be the one superimposed on the vessel 5, can be likewise manipulated to vent the pot before uncovering it.

What I claim as new and desire to secure by Letters Patent, is:

1. The combination cooking utensil comprising superimposed vessels adapted to be seated one on the other with each superjacent vessel free for rotation on the subjacent vessel and each vessel formed with one or more lip members adapted to be moved into and out of register with the corresponding lip members of a subjacent vessel to close or vent such subjacent vessel.

2. The combination cooking utensil comprising a bottom, an intermediate and an inverted top cooking vessel, all formed with corresponding marginal shoulders, each vessel having its respective handle means and formed with a pouring lip out of line with its handle means, the intermediate vessel having its lip formed in a shouldered enlargement the base of which is adapted to form a closure for the corresponding vent in the subjacent vessel, and the pouring lip on the top vessel when it is inverted being adapted to form a closure for the vent formed in said shouldered enlargement on the intermediate vessel.

3. A cooking utensil according to claim 2, in which the top vessel is a frying pan formed with a top marginal centering lip adapted to fit into the top of the intermediate vessel and disposed throughout concentric with said pan so that the latter is free to rotate in centered relation on the intermediate vessel.

4. As a component element of a combination cooking utensil, an intermediate baking pan having a shoulder the upper portion of which forms a pouring lip for the pan and the lower portion of which forms a closure designed and arranged to form a seal for a corresponding pouring lip in a subjacent vessel, and a handle for said vessel remote from said shoulder.

5. As a component element of a combination utensil, a frying pan having a pouring lip, a top flange providing a horizontal face with a raised centering shoulder extending about said face and throughout concentric with the pan, and a handle remote from said lip.

EDWARD W. BLANKENSHIP.